United States Patent [19]

Kinoshita

[11] Patent Number: 4,983,996
[45] Date of Patent: Jan. 8, 1991

[54] DATA RECORDING APPARATUS FOR STILL CAMERA

[75] Inventor: Satoshi Kinoshita, Tokyo, Japan

[73] Assignee: Casio Computer Co., Ltd., Tokyo, Japan

[21] Appl. No.: 527,705

[22] Filed: May 22, 1990

Related U.S. Application Data

[63] Continuation of Ser. No. 400,567, Aug. 30, 1989, abandoned.

[30] Foreign Application Priority Data

Sep. 2, 1988 [JP] Japan .......................... 63-115649[U]

[51] Int. Cl.$^5$ .............................................. G03B 29/00
[52] U.S. Cl. ...................................... 354/76; 354/106
[58] Field of Search ................................. 354/76, 106

[56] References Cited

U.S. PATENT DOCUMENTS 3,439,598  4/1969  Weitzner et al. .................... 354/76
3,691,312  9/1972  Petersen ............................. 360/2
4,270,854  6/1981  Stemme et al. ...................... 354/76

FOREIGN PATENT DOCUMENTS 60-260932  12/1985  Japan .

Primary Examiner—Michael L. Gellner
Attorney, Agent, or Firm—Frishauf, Holtz, Goodman & Woodward

[57] ABSTRACT

A data recording apparatus for a still camera has a microphone to which an external voice is input. A voice signal of the input external voice is converted into a bar-code pattern data by a pattern converter and then recorded onto a silver-salt film through LC-cell. A developed pattern data on a photograph is read out by a bar-code reader and decoded into the original voice signal. A voice corresponding to the decoded voice signal is generated through a speaker.

17 Claims, 2 Drawing Sheets

DATA RECORDING APPARATUS FOR STILL CAMERA

This application is a continuation of U.S. patent application Ser. No. 07/400,567, filed Aug. 30, 1989 now abandoned.

BACKGROUND OF THE INVENTION

1. Field of the Invention

The present invention relates to a data recording apparatus for a still camera capable of printing data onto still-camera film by the use of a liquid crystal display device or LED display device.

2. Description of the Related Art

Still cameras have been known in the past which are provided with a data printing device for printing date data obtained by a time counting circuit and letter data input by key operation onto photosensitive film such as silver-salt film by the use of a liquid crystal display device, LED and like.

In order to record comment data onto still-camera film, the data recording apparatus requires a number of input keys which are used to input a comment. For example, twenty-six keys for letters A to Z must be provided on the apparatus to record letters A to Z. In an ordinary electronic appliance provided with letter keys, its key input section which includes keys each representing one of the alphabet letters requires a wide space on the appliance for installation of the key input section itself. Therefore, it has been proposed to use keys each representing two three letters of the alphabet so as to reduce the number of keys to be used in the appliance.

However, even though a letter key representing, for example, three letters of the alphabet is used, nine letter keys are required in total to input letter data. Accordingly, in order to input comment data with use of keys, a still camera needs a wide space for installation of the key input section. A drawback in the conventional still camera having the key input section exists in that it is hard to make the camera body small and compact in size.

Meanwhile, it has been proposed to record audio comment information without using letter keys or without using printing means. For example, in U.S. Pat. Nos. 3,439,598, 3,691,312 and 4,270,854 still cameras which record spoken information on a magnetic tape are shown and described.

Installation of a magnetic tape recording apparatus on the still camera not only makes the still camera itself large in size but also can be a cause of mechanical troubles when an impact is externally applied thereto, since the magnetic tape recording apparatus includes fine mechanisms for transporting the magnetic tape and for moving the magnetic head.

SUMMARY OF THE INVENTION

The present invention has been made in the light of the above affairs, and its object is to provide a data recording apparatus for a still camera with an extremely simple construction, which is capable of storing spoken information externally applied thereto and can be made small and compact in size.

To achieve the above object, according to the present invention there is provided a data recording apparatus for a still camera comprising: an optical lens; photosensitive material onto which an object image guided through said optical lens is recorded; voice input means; voice converter means for converting a voice input from said voice input means into a digital data; pattern converter means for converting the digital data converted by said voice converter means into a corresponding pattern data; and printing means for recording a pattern image of the pattern data onto said photosensitive material, said pattern data converted by said pattern converter means.

As constructed above, the still camera to which the invention is applied can be made small and compact in size, since the apparatus is capable of recording voice information without using a magnetic head and a magnetic tape.

DESCRIPTION OF THE PREFERRED EMBODIMENTS

Now, preferred embodiments of the invention will be described with reference to the accompanying drawings.

Figure 1:
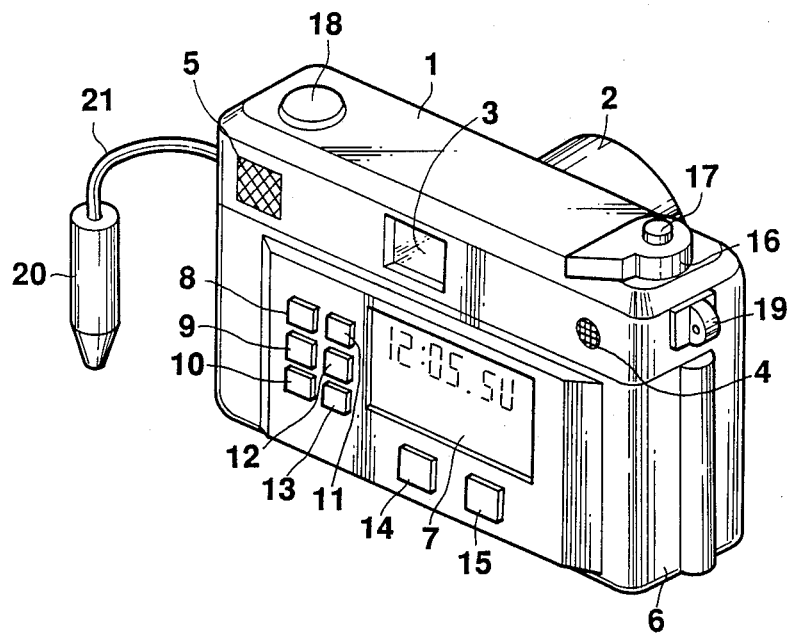
FIG. 1 is an external perspective view of the still camera to which the present invention is applied.

FIG. 1 is a view showing the external perspective view of an embodiment of the invention applied to a still camera (hereinafter, referred to as a camera) provided with a data printing apparatus.

On the front side of the camera body 1, there is provided a lens 2 as an optical system through which the image of an object is transferred. The rear portion of the camera body 1 mounts a viewfinder 3 through which an object is viewed, a built-in microphone 4 for receiving a voice, and a built-in speaker 5 for audibly outputting a voice. On the rear cover 6 of the camera body 1, there are provided a display panel 7 for displaying data to be printed, a switch 8 for selecting a mode of operation, switches 9, 10 and 12 for setting various data, a start switch 13, a recording-mode switch 14 and a play-back mode switch 15.

The display panel 7 for displaying data to be displayed is composed of a liquid crystal display device, that displays a date, a day of the week and a voice data all of which are to be printed.

The mode selecting switch 8 serves to select one mode out of a time mode, a shutter-speed mode, an aperture scale mode and a film-sensitivity mode. A desired data in respective modes is input by operation of switches 9, 10, 11 and 12.

The recording-mode switch 14 is manipulated to record a spoken comment information. In the recording mode set by manipulation of the recording-mode switch 14, a recording operation is started when the start switch 13 is manipulated.

The play-back mode switch 15 is manipulated to set the play-back mode, in which it is verified whether or not a voice data of the comment to be recorded has been precisely recorded on the photosensitive material (silver-salt film). In the play-back mode, the recorded voice is reproduced when the start switch 13 is manipulated.

At the side portion of the top of the camera body 1, there is provided a film advance lever 16 and a shutter button 17 is provided on the rotary axis of the above film advance lever 16. At the other side of the top of the camera body 1, there is provided a knob 18 associated with a member for receiving a shaft of a film patrone. The side portion of the camera body 1 mounts a strap lug 19. Connected to the other side of the camera body 1 through a connecting cord 21 is a bar-code reader 20 as an optical reading instrument for reading a bar-code pattern from a printing paper on which as will be described a pattern of a bar-code data transferred onto the photosensitive material is printed.

The connecting cord 21 of the bar-code reader 20 is provided with a plug (not shown) and the camera body 1 is provided with a jack (not shown). With the above plug and jack, the bar-code reader 20 is detachably connected to the camera body 1. The bar-code reader 20 is mounted on the camera when it is used to read the bar-code pattern printed on a printing paper.

Figure 2:
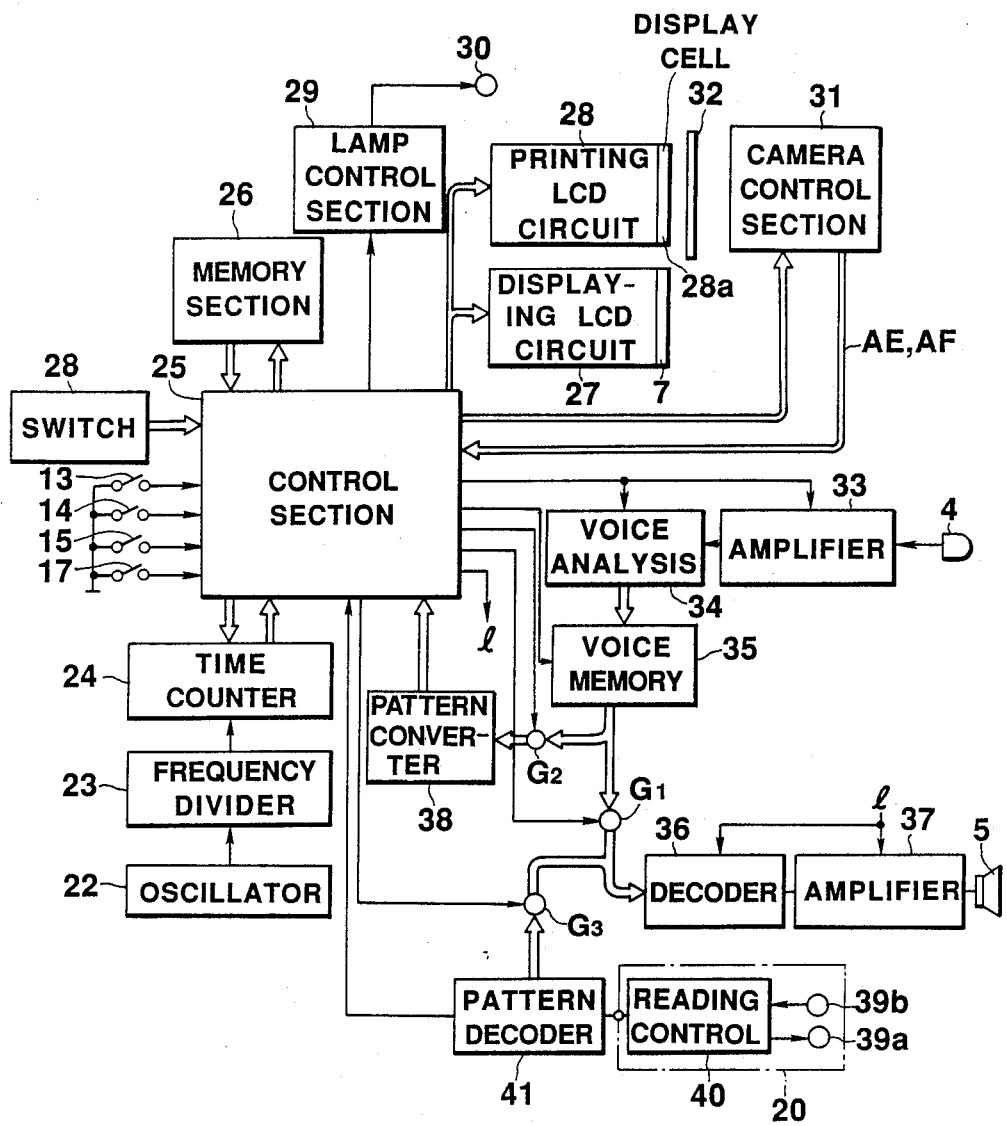
FIG. 2 is a circuit diagram of the still camera shown in FIG. 1.

FIG. 2 is the circuit diagram of the above still camera. The camera 1 accommodates a timepiece for producing data such as date data and day-of-the-week data, all of which are to be photographed or printed on a printing paper. An oscillator 22 is a crystal oscillator which generates a reference signal of the above timepiece. The reference signal generated by the oscillator 22 is supplied to a frequency divider 23 for frequency division to produce a time count signal which is delivered to a time counter 24.

The time counter 24 is a circuit which counts the delivered time count signal to generate present date data including month data, day data and day-of-the-week data. The present date data generated by the time counter 24 is input to a control section 25.

The control section 25 is composed of a ROM which stores a program for controlling a whole system of the still camera and a micro-processor which performs operations on data under control of the program to output control data. The control section 25 outputs the present date data supplied from the time counter 24 to a displaying LCD circuit 27 and also to a printing LCD circuit 28. The displaying LCD circuit 27 comprises the display panel 7 shown in FIG. 1 for displaying data to be printed. The display panel 7 displays the present date data.

The printing LCD circuit 28 is provided with a liquid crystal cell 28a of a guest host type. In the liquid crystal cell 28a of the printing LCD circuit 28, the segments other than those to which a voltage is applied during exposure for printing prevent the light of a lump 30 used for printing from passing through the segments themselves. The segments for printing comment data are composed of dots disposed in matrix.

The printing LCD circuit 28 serves as a switch section which includes the mode selecting switch 8 and the data setting switches 9, 10, 11 and 12. Shutter speed data, aperture scale data, film sensitivity data and the like which are input through the switch section 28 are stored in a memory section 26 which is composed of RAM.

When the recording mode switch 14, the play-back mode switch 15 and the start switch 13 are manipulated, the respective switches output their signals to the control section 25. Upon receipt of the signal from the recording mode switch 14, the control section 25 sets the system in the recording mode. When the start switch 13 is operated, the control section 25 outputs the control signal to an amplifier 33, a voice analysis circuit 34 and a voice memory 35 in order to receive a voice through the microphone 4.

More specifically, in order to audibly input, prior to taking a picture, comment information to be recorded, such as a comment concerning an object to be photographed, i.e., the name of a place to be photographed and the name of the person to be photographed, the user of the camera operates the start switch 13 in the recording mode. When the start switch 13 is operated, the control section 25 outputs the signal to clear the voice memory 35 and thereby the voice digital data previously stored in the voice memory are cleared. The comment information audibly input through the microphone 4 is converted into a voice analog signal and then delivered to the amplifier 33. The amplifier 33 amplifies the received voice analog signal and outputs the same to the voice analysis circuit 34.

The voice analysis circuit 34 consists of, for example, an Adaptive Difference PCM circuit (ADPCM circuit), which converts the received voice analog signal into a corresponding voice digital data and outputs the same to the voice memory 35. The voice memory 35 stores the received voice digital data. The voice memory 35 consists of, for example, RAM. Under the condition that the voice digital data is retained in the above voice memory 35, the system is brought to the play-back mode, when the play-back mode switch 15 is operated. When the start switch 13 is operated in the play-back mode, the signal for reproducing the voice is supplied through the control section 25 to the voice memory 35, a gate G1, a decoder 36 and an amplifier 37, respectively. Upon receipt of the above signal, the voice memory 35 supplies the voice digital data through the gate G1 to the decoder 36. The decoder 36 converts the supplied voice digital data into the voice analog signal and outputs the same to the amplifier 37. The amplifier 37 amplifies the received voice analog signal to audibly output the same through the speaker 5. In the above manner, the user of the camera can verify whether or not the input voice has been precisely stored.

When the user of the camera operates the shutter switch 17 with the lens directed to an object, the signal from the shutter switch 17 is supplied to the control section 25. Then, the control section 25 outputs the control data to a camera control section 31 in accordance with various data stored in the memory section 26. On the basis of the above control signal, data of the distance between the camera lens and the object and data of the brightness of the object, the camera control section 31 sets the optical system and drives the shutter to provide the object image onto the film 32.

When the time counter 24 delivers date data to the printing LCD circuit 28 and at the same time the control section 25 outputs the control signal to the voice memory 35 and a gate G2, the voice digital data is supplied from the voice memory 35 to a pattern converter 38. The pattern converter 38 is a circuit which converts the voice digital data from the voice memory into a pattern data of a corresponding bar code. In other words, the circuit operates so as to discriminate data consisting of "1" or "0" from the voice memory 35 by every predetermined number of bits and convert them into a corresponding bar code pattern. The converted pattern data is delivered to the printing LCD circuit 28 through the control section 25.

The segments for comment of the liquid crystal cell 28a of the printing LCD circuit 28 are composed of a dot-matrix display member. The control section 25 supplies a lamp-on instruction signal to a lamp driver section 29 to turn on the lamp 30 for printing. Meanwhile, the date data and the bar code data are supplied to the printing LCD circuit 28 and these data are transferred onto the film 32.

Figure 3:
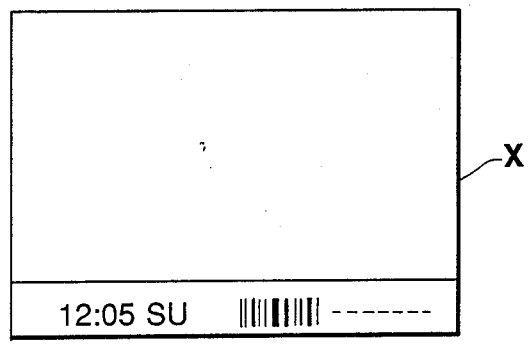
FIG. 3 is a view showing a printing paper printed by use of the above still camera.

FIG. 3 is a view showing a printing paper (a photograph) on which the above developed film 32 is printed. FIG. 3 shows that the date data and the day-of-the-week date, i.e., 12:05 su (December 5, Sunday) and also the bar code pattern of the comment information are printed at the bottom of the printing paper. On the upper portion X of the printing paper, an object image transferred through the lens 2 of the camera control section 31 is printed.

Now, a circuit will be described which audibly reproduces the bar code pattern printed on the printing paper. A bar-code reader 20 is composed of a light source 39a, a reading sensor 39 and a reading control section 40. The reading sensor 39 serves to read as a series of digital values "1" and "0" the light of the light source 39a which is reflected from the bar code pattern printed on the printing paper and the reading control section 40 serves to output the series of digital values as a digital signal.

The digital signal of the bar code pattern output from the bar-code reader 20 is decoded into a voice digital data corresponding to the bar code pattern by a pattern decoder 41. Then the voice digital data is supplied through the gate G3 to the decoder 36 to be decoded into a voice analog signal.

The decoder 36 converts the supplied voice digital data into a voice analog signal. The voice analog signal is amplified by the amplifier 37 and it is audibly output from the speaker 5.

In this manner, in the data recording apparatus according to the invention, spoken comment information is transferred onto a photosensitive film as a pattern image, which is printed on a printing paper, and the pattern image printed on the printing paper is subjected to a reproduction processing and thereby the comment information is audibly output. Accordingly, a small-sized data printing apparatus can be provided which is capable of recording comment information without using a number of letter keys.

While in the above mentioned embodiment, the ADPCM circuit is employed as the voice analysis circuit 34 and the data stored in the voice memory 35 is converted into the bar code pattern data by the pattern converter 38 and then the bar code pattern data is transferred onto the film 32, the pattern into which the data is converted is not limited to the bar code. More specifically, the pattern is printed onto the film 32 so as to be read out and audibly reproduced by the optical reader device 20. Therefore, if the relationship between the voice digital data to be input to the pattern converter 38 and the converted pattern data coincides with the relationship between the pattern data to be input to pattern decoder 41 and the decoded voice digital data, the same effects according to the embodiment can be obtained and it will be understood that the pattern into which the data is converted is in no way limited to the bar code.

Also, while in the embodiment mentioned above one line of data is transferred onto the film 32, several lines of data may be printed onto the film 32.

Also, it is possible to use a voice recognition circuit in the voice analysis circuit 34. With employment of the voice recognition circuit, an input voice could be recognized and the recognized voice recognition data, i.e., a letter code data corresponding to the input voice, is stored in the voice memory 35. This letter code data stored in the voice memory 35 is converted into a display pattern data by the pattern converter 38 and thereby the display pattern data could be transferred onto the film 32. In this case, in order to recognize input voices of English words, not only large-memory is required for recognition of the voices but also operation of the recognition becomes extremely complex. Then, reference pattern memory means is provided for storing voice reference patterns of only twenty six letters of the alphabet such as "A", "B", "C" and so on and comparator means is further provided for comparing the input voice pattern with each of the voice reference patterns stored in the reference pattern memory means, whereby input voices of letters could be recognized and projected onto the film 32.

Accordingly, in case that the user of the camera wants to print for example, a place-name "New York", he could print letters "NEW YORK" when he input voices of letters, "N", "E", "W" and so on, instead of spoken "New York".

In this manner, the user could read letter data directly from the printing paper on which the developed film is printed and as a result, the bar-code reader 20 is not needed.

While in the embodiment described above, the liquid crystal cell has been used as a display member for printing comment information, other printing devices such as LED could be used. Further, in the embodiment, the comment information is printed at the time when a photograph of an object is taken, however the comment information could be printed before or after that the photograph of the object is taken.

Furthermore, the construction for inputting voices, such as the above mentioned microphone 4, amplifier 33, voice analysis circuit 34, voice memory 35 and pattern converter 38 and the construction for outputting voices such as the speaker 5, the amplifier 37 and the decoder 36 could be accomodated in a casing which is prepared separately from the camera body 1 and they could be electrically connected through a cable, properly.

What is claimed is:

1. A data recording apparatus for a still camera, comprising:
    an optical lens;
    photosensitive material onto which an object image guided through said optical lens is recorded;
    voice input means;
    voice converter means for converting a voice input from said voice input means into digital data;
    pattern converter means for converting the digital data converted by said voice converter means into corresponding bar code data;
    printing means for transferring a pattern image of the bar code data onto said photosensitive material, said bar code data converted by said pattern converter means;
    optical reading means for reading a pattern image recorded on a printing paper;
    converter means for converting the pattern image read by said optical reading means into voice data; and
    audio means for converting the voice data converted by said converter means into a voice and for audibly outputting said voice.

2. The data recording apparatus of claim 1, further comprising:

date counter means for obtaining a present date data; and wherein said printing means includes means for transferring the present date data obtained by said date counter means onto said photosensitive material.

3. The data recording apparatus of claim 1, wherein said photosensitive material comprises a silver-salt film.

4. The data recording apparatus of claim 1, wherein said printing means comprises a liquid crystal cell and lighting means.

5. The data recording apparatus of claim 4, wherein said liquid crystal cell is of a Guest Host type.

6. The data recording apparatus of claim 1, further comprising:
digital data memory means for storing the digital data converted by said voice converter means.

7. A data recording apparatus for a still camera, comprising:
an optical lens system;
photosensitive material onto which an object image guided through said optical lens system is printed;
voice input means;
digital data memory means for storing digital data;
pattern converter means for converting the digital data in said digital data memory means into corresponding pattern data;
printing means for printing the pattern data converted by said pattern converter means onto said photosensitive material;
optical reading means for reading a pattern image recorded on a printing paper; and
reproducing means for reproducing the pattern image read by said optical reading means into digital data, which is the same as the digital data stored in said digital data memory means.

8. The data recording apparatus of claim 7, wherein said pattern image read by said optical reading means corresponds to said pattern data.

9. The data recording apparatus of claim 7, wherein said photosensitive material comprises a silver-salt film.

10. The data recording apparatus of claim 7, wherein said pattern converter means includes means for converting the digital data stored in said digital data memory means into bar code data.

11. The data recording apparatus of claim 10, wherein said liquid crystal cell is of a Guest Host type.

12. The data recording apparatus of claim 7, wherein said printing means comprises a liquid crystal cell and lighting means.

13. The data recording apparatus for a still camera, comprising:
an optical system;
photosensitive material onto which an object image guided through said optical system is transferred;
voice input means;
pattern converter means for converting a voice input from said voice input means into corresponding pattern data;
printing means for transferring a pattern image of the pattern data converted by said pattern converter means onto said photosensitive material;
optical reading means for reading a pattern image recorded on a printing paper;
converter means for converting the pattern image read by said optical reading means into voice data; and
audio means for converting the voice data converted by said converter means into a voice and for audibly outputting said voice.

14. The data recording apparatus of claim 13, wherein said photosensitive material comprises a silver-salt film.

15. The data recording apparatus of claim 13, wherein said printing means comprises a liquid crystal cell and lighting means.

16. The data recording apparatus of claim 15, wherein said liquid crystal cell is of a Guest Host type.

17. The data recording apparatus of claim 13, further comprising:
voice converter means for converting a voice input from said voice input means into digital data; and
digital data memory means for storing the digital data converted by said voice converter means;
and wherein said pattern converter means includes means for converting digital data from said digital data memory means into said corresponding pattern data.

* * * * *